W. H. PRIDGEN.
MACHINE FOR HARVESTING CLOVER SEEDS.
APPLICATION FILED SEPT. 15, 1915.
1,186,832.
Patented June 13, 1916.
4 SHEETS—SHEET 2.
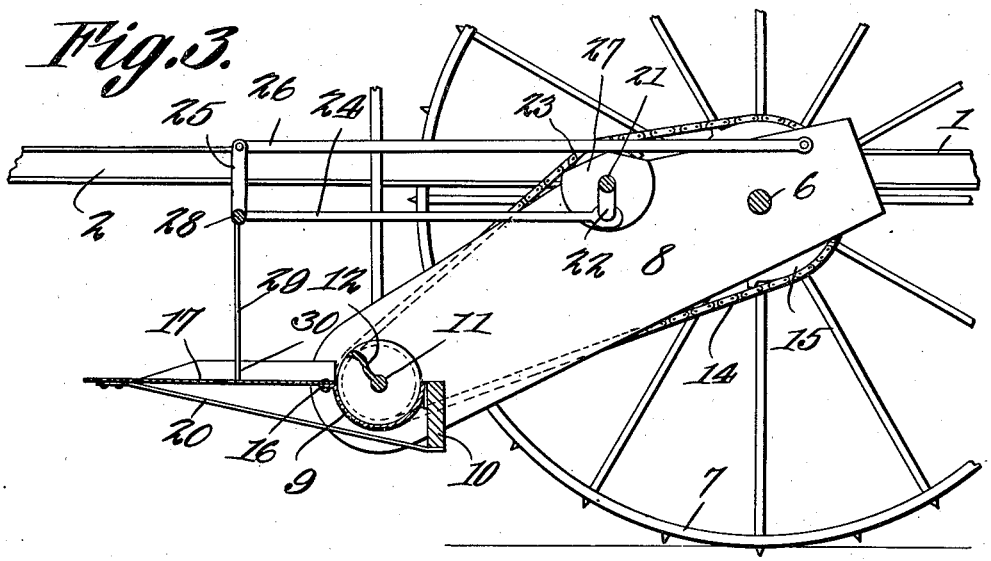
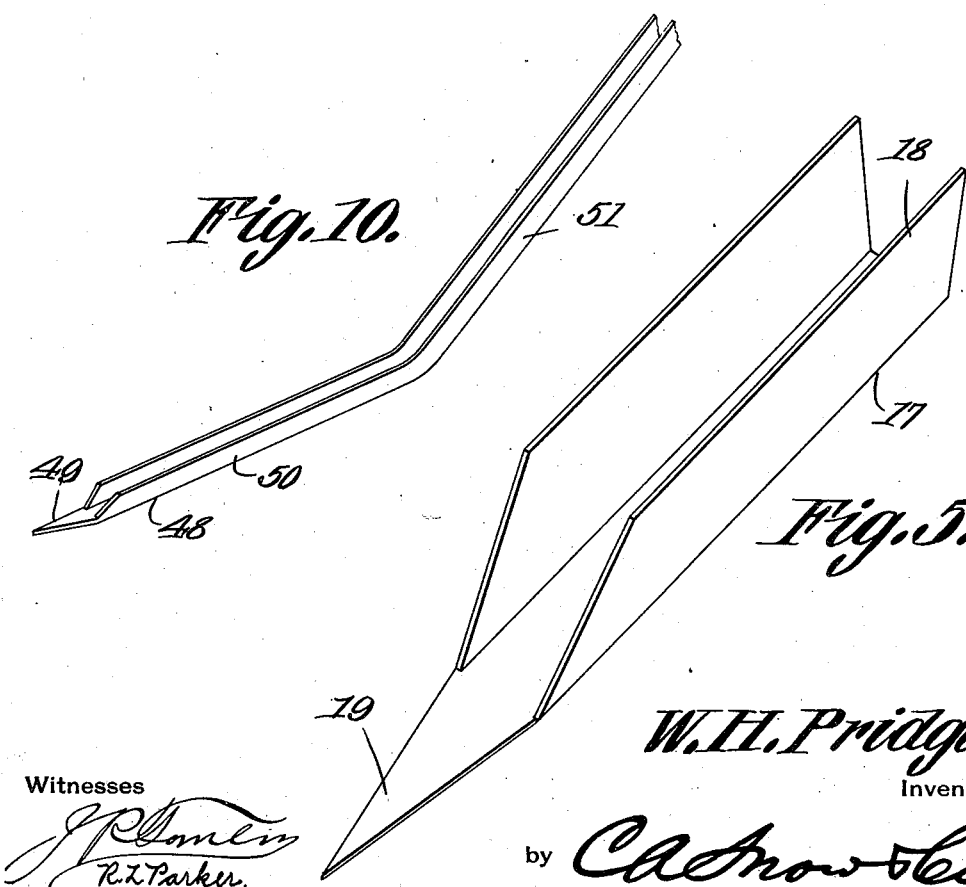
Witnesses
W. H. Pridgen
Inventor,
by C. A. Snow & Co.
Attorneys.

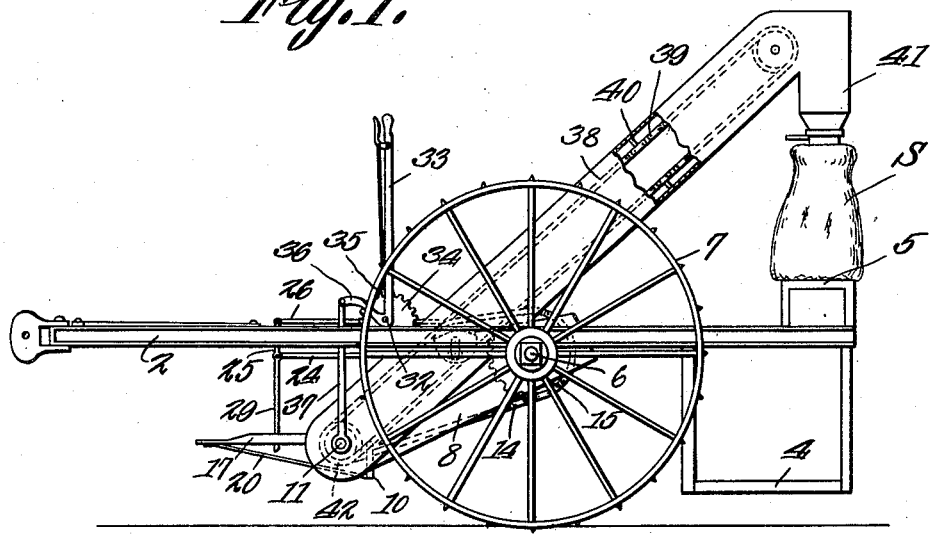

W. H. PRIDGEN.
MACHINE FOR HARVESTING CLOVER SEEDS.
APPLICATION FILED SEPT. 15, 1915.
1,186,832.
Patented June 13, 1916.
4 SHEETS—SHEET 3.
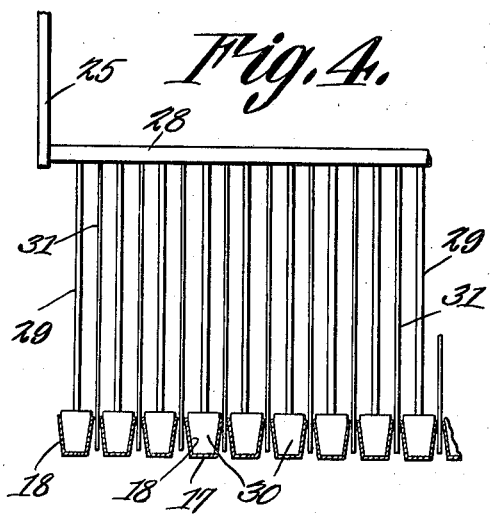
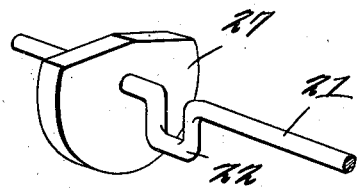
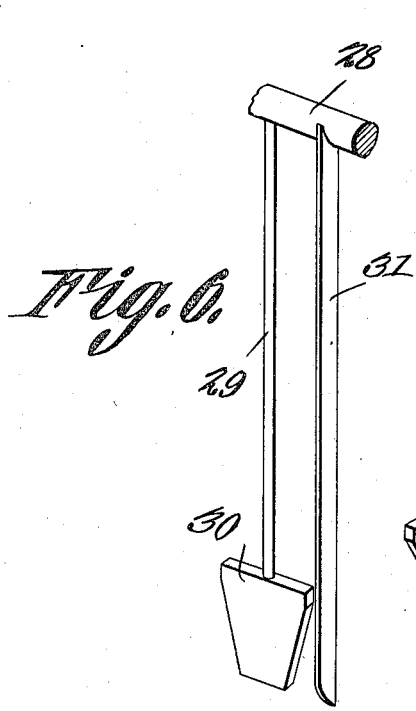
W. H. Pridgen
Inventor,
by C. A. Snow & Co.
Attorneys.
Witnesses W. H. PRIDGEN.
MACHINE FOR HARVESTING CLOVER SEEDS.
APPLICATION FILED SEPT. 15, 1915.

1,186,832.

Patented June 13, 1916.
4 SHEETS—SHEET 4.

Witnesses

W. H. Pridgen Inventor,
by C. A. Snow & Co.
Attorneys

UNITED STATES PATENT OFFICE.

WILEY H. PRIDGEN, OF CREEK, NORTH CAROLINA.

MACHINE FOR HARVESTING CLOVER-SEEDS.

1,186,832. Specification of Letters Patent. Patented June 13, 1916.

Application filed September 15, 1915. Serial No. 50,784.

*To all whom it may concern:*

Be it known that I, WILEY H. PRIDGEN, a citizen of the United States, residing at Creek, in the county of Warren and State of North Carolina, have invented a new and useful Machine for Harvesting Clover-Seeds, of which the following is a specification.

This invention relates to machines for harvesting clover seeds, one of the objects being to provide a series of stripping and holding fingers which are held against movement relative to adjacent parts of the machine and which have combined with them means for automatically engaging the accumulated seeds on the fingers and dragging them rearwardly into position for engagement by conveying means.

A further object is to provide scraping or feeding means of simple construction and which is operated by the forward movement of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

Figure 8:
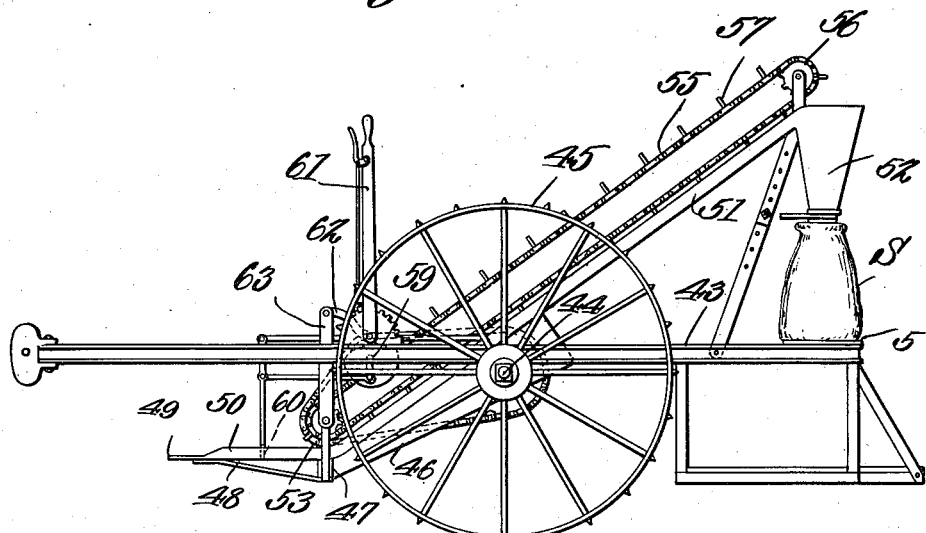
Figure 9:
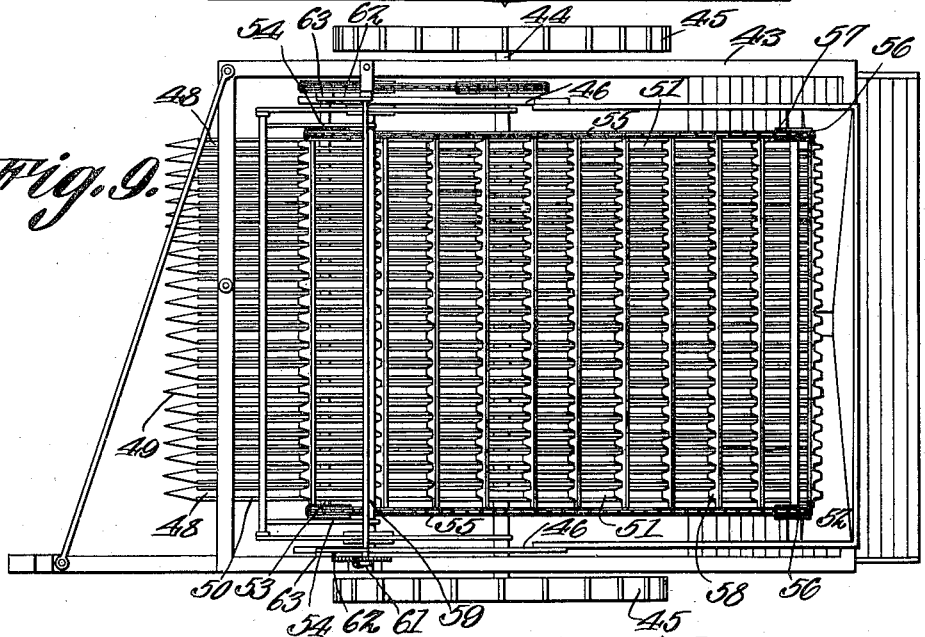

In said drawings:—Figure 1 is a side elevation of a machine embodying the present improvements. Fig. 2 is a plan view thereof. Fig. 3 is an enlarged vertical longitudinal section through a portion of the machine. Fig. 4 is a vertical transverse section through several of the fingers and showing the scraping and clearing means coöperating therewith. Fig. 5 is an enlarged perspective view of one of the stripping fingers. Fig. 6 is a perspective view of one of the scrapers and clearing blades. Fig. 7 is a perspective view of the cam and crank shaft used for actuating the scrapers and clearing blades. Fig. 8 is a side elevation of a modified form of machine. Fig. 9 is a plan view thereof. Fig. 10 is a perspective view of one of the stripping fingers and a guide extending therefrom. Fig. 11 is a perspective view of a drag used in connection with said fingers and guides. Fig. 12 is a transverse section through certain of the guides and showing a portion of a drag in position thereon.

Referring to the figures by characters of reference 1 designates a frame having a draft tongue 2 extending forwardly from one side thereof and provided with a brace 3. A platform 4 is carried by and below the rear portion of the frame and above this platform at one side is arranged a shelf 5 on which a sack S is adapted to be placed for filling.

Journaled within the sides of the frame 1 is a drive axle 6 engaging supporting wheels 7 and pivotally mounted on this axle are guards 8 extending downwardly and forwardly. Connecting the guards 8 at their forward ends is a transverse trough 9 back of which is arranged a reinforcing bar 10. A transverse shaft 11 is journaled in the guards 8 and is concentric with the trough, there being a worm conveyer 12 secured to this shaft and working within the trough. The shaft 11 is provided at one end with a sprocket 13 and this sprocket receives motion, through a chain 14, from a sprocket 15 secured to the drive axle 6.

Extending forwardly from the trough 9 is a ledge 16 to which are secured spaced stripping fingers 17 one of which has been illustrated in detail in Fig. 5. Each of these fingers has upwardly diverging side walls 18 and the bottom of each finger is pointed at its forward end, as at 19, said pointed portion extending beyond the front ends of the walls 18. That portion of each finger having the walls 18, constitutes a guide for the reception of seeds stripped by the pointed portions of the fingers. Braces 20 may be extended downwardly and rearwardly from the front portion of each finger 17 to the bar 10 as shown particularly in Fig. 3.

Journaled within the guards 8 is a transverse shaft 21 provided with cranks 22 and secured to this shaft is a sprocket 23 which receives motion from chain 14. A crank 22 is adjacent each of the guards 8 and each of these cranks is connected to a pitman 24 extending forwardly to a link 25. These links connect the pitmen 24 to rods 26 which are pivotally connected to the respective guards 8 and bear downwardly by gravity on cams 27 secured to the shaft 21.

The links 25 are fixedly attached to the end portions of a transverse rod 28 and extending downwardly from this rod are stems 29 the lower ends of which are provided with scraping blades 30 so shaped as to fit snugly within the trough-like guides formed by the fingers 17 and their upstanding walls 18. Extending downwardly from rod 28 and between the stems 29 are clearing blades 31 which project into the spaces between the fingers, as shown particularly in Fig 4.

Journaled upon the sides of the frame 1 is a transverse shaft 32 to which is secured a lever 33 adapted to be held against movement in any suitable manner, as by means of a toothed segment 34 and a pawl 35. Extending from the end portions of shaft 32 are crank arms 36 and each of these arms is connected by a link 37 to one end of the shaft 11 or, if preferred, to the respective guards 8. Thus it will be seen that by manipulating lever 33, the guards 8 can be swung upwardly or downwardly about the axle 6 as a center, thus to bring the stripping fingers 17 to any desired position relative to the surface of the ground.

Extending upwardly and rearwardly from and bolted or otherwise fixedly secured to one of the guards 8 is an elevator casing 38 the lower end portion of which is adapted to receive material discharged from the trough 9 by the worm 6. In this casing 38 is arranged an elevator preferably in the form of an endless chain 39 connected by slats 40 constituting drags adapted to work along the bottom of the casing 38. Thus it will be seen that during the operation of the elevator any material discharged into the bottom portion of the casing 38 will be drawn upwardly along the bottom of said casing by the slats or drags 40 and discharged from the casing through a spout 41, thus to fall into the sack S. The elevator can be driven in any desired manner, as by means of sprockets 42 secured to the shaft 11 and located within the lower portion of the casing 38.

It will be apparent that when the machine is moved forwardly, motion will be transmitted from the axle 6 through chains 14 to the shafts 21 and 11. During the rotation of shaft 21 the cranks 22 will oscillate the links 25 so as to swing stems 29 and blades 31 forwardly and rearwardly. Cams 27 are so arranged and proportioned that, during the forward swinging of the links 25 the cams will press upwardly upon the rods 26, thus to hold the scrapers 30 out of contact with the fingers 17. However, during the rearward swinging of the scrapers, the cams will permit the rods 26 to lower with the result that the scrapers will drag backwardly along the fingers 17. As the machine is drawn forwardly, the fingers will strip the seeds from the plants and these seeds will fall into the trough-like guides provided by the walls 18 and the seeds thus accumulated will be scraped rearwardly in the manner pointed out and be deposited in the trough 9. Worm 12 will discharge them laterally into the elevator casing where they will be engaged by the drags and carried upwardly to the spout 41.

Instead of utilizing the worm conveyer for discharging seeds laterally, a slightly modified structure such as shown in Figs. 8 to 12 inclusive may be employed. By referring to these figures it will be seen that the main frame 43 is provided with a drive axle 44 supported by wheels 45 as hereinbefore pointed out. Pivotally mounted on the axle 44 are side members 46 connected at their lower ends by a cross bar 47. Secured upon this cross bar and extending forwardly therefrom are stripping fingers 48 having pointed forward ends 49 and having upwardly diverging side walls 50 similar to the walls 18 hereinbefore described. However, instead of discharging rearwardly into a transverse trough such as shown at 9, these fingers merge into upwardly and rearwardly inclined trough-like guides 51 constituting continuations of the back portions of the fingers 48 and which guides discharge into a hopper or discharge spout 52 designed to direct the accumulated seeds into a sack S. A transverse shaft 53 is journaled above the lower end portions of the guides 51 and has sprockets 54 engaging endless chains 55. The upper portions of these chains are mounted on sprockets 56 adjacent the upper ends of the guides 51 and secured to these chains are slats 57 having wings 58 constituting drags adapted to fit snugly within the guides 51. A transverse shaft 59 similar to the shaft 21, is provided and operates scrapers and clearing blades or knives such as heretofore described and which have been indicated generally at 60. The members 46 and the parts carried thereby are all tiltably mounted on the axle 44 and can be adjusted angularly upon said axle by a lever 61 having crank arms 62 connected to the members 46 by links 63. With this modified form of machine it will be obvious that when the same is moved forward the fingers 48 will strip the seeds from the plants and the seeds will fall between the walls 50 of the fingers 48. The scrapers will here engage the seeds and draw them rearwardly along the fingers as hereinbefore pointed out until they are brought into the paths of the drags 58 which will operate to draw the seeds upwardly along the guides 51 and deposit them in the hopper or spout 52.

Obviously, if desired, instead of providing separate guides 51 for the respective fingers 48, said fingers can discharge on a single guide extending throughout the width of the series of fingers, and instead of providing separate drags 58 extending from the slats 57, a single straight drag can be extended across the entire guide so as to drag the seeds upwardly along the single guide to the spout or hopper at the upper end thereof. This construction is so obvious that it is not deemed necessary to describe or illustrate the same in detail.

What is claimed is:—

1. In a clover seed harvester, a series of spaced stripping fingers having trough-like guides, seed conveying means, means for scraping seeds along the fingers to the conveying means, and clearing blades movable with the scraping means and between the fingers.

2. In a clover seed harvester, the combination with a wheel supported structure, an inclined portion, and means for dragging seeds upwardly along said inclined portion, of stripping fingers having trough-like guide portions, scrapers above the respective fingers, means for oscillating the scrapers forwardly and rearwardly, means for raising the scrapers during their forward swinging movement and for lowering the scrapers during their rearward swinging movement to direct seeds from the fingers toward the dragging means, and clearing blades movable with the scrapers and extending between the fingers.

3. In a clover seed harvester, spaced stripping fingers, a revoluble crank shaft, pivoted scrapers hung above the fingers, a pitman connection between the scrapers and the crank shaft, a cam revoluble with the crank shaft, and a pivoted rod bearing on the cam and pivotally connected to and supporting the scrapers, said cam and crank shaft operating to successively raise the rod and scrapers and swing the scrapers toward the points of the fingers and to lower the rod and scrapers and draw the scrapers toward the rear ends of the fingers.

In testimony that I claim the foregoing as my own, I have hereto affixed my signature in the presence of two witnesses.

WILEY H. PRIDGEN.

Witnesses:
  PETER M. STALLINGS,
  EDWARD C. PRICE.